United States Patent
Borshack et al.

(10) Patent No.: US 9,262,423 B2
(45) Date of Patent: Feb. 16, 2016

(54) LARGE SCALE FILE STORAGE IN CLOUD COMPUTING

(71) Applicant: Microsoft Technology Licensing, LLC, Redmond, WA (US)

(72) Inventors: Ronen Borshack, Ginaton (IL); Anil Francis Thomas, Redmond, WA (US); Erez Einav, Tel-Aviv (IL); Philip Ernst Taron, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 299 days.

(21) Appl. No.: 13/629,053

(22) Filed: Sep. 27, 2012

(65) Prior Publication Data

US 2014/0089273 A1    Mar. 27, 2014

(51) Int. Cl.
*G06F 17/30* (2006.01)

(52) U.S. Cl.
CPC .... *G06F 17/30067* (2013.01); *G06F 17/30097* (2013.01)

(58) Field of Classification Search
USPC ................................... 707/822, 698
See application file for complete search history.

(56) References Cited

U.S. PATENT DOCUMENTS

| | | | | |
|---|---|---|---|---|
| 7,162,571 B2 * | | 1/2007 | Kilian et al. | 711/108 |
| 7,254,596 B2 * | | 8/2007 | De Spiegeleer | 707/758 |
| 7,287,046 B2 * | | 10/2007 | Bulka et al. | 707/999.202 |
| 7,412,449 B2 * | | 8/2008 | Both | |
| 7,739,740 B1 * | | 6/2010 | Nachenberg et al. | 726/25 |
| 7,966,599 B1 * | | 6/2011 | Malasky et al. | 717/100 |
| 2005/0125411 A1 * | | 6/2005 | Kilian et al. | 707/10 |
| 2009/0307184 A1 * | | 12/2009 | Inouye et al. | 707/2 |
| 2010/0268632 A1 | | 10/2010 | Rosenthal | |
| 2010/0312749 A1 | | 12/2010 | Brahmadesam et al. | |
| 2011/0113036 A1 * | | 5/2011 | Idicula et al. | 707/747 |
| 2011/0246433 A1 | | 10/2011 | Sun | |
| 2012/0016917 A1 * | | 1/2012 | Priddle et al. | 707/827 |
| 2012/0136834 A1 | | 5/2012 | Zhao | |
| 2012/0204024 A1 * | | 8/2012 | Augenstein et al. | 713/150 |
| 2013/0151492 A1 * | | 6/2013 | Kirihata | 707/696 |
| 2013/0173530 A1 * | | 7/2013 | Laron | 707/608 |
| 2013/0191350 A1 * | | 7/2013 | Esaka et al. | 707/692 |
| 2014/0075542 A1 * | | 3/2014 | Boback et al. | 726/15 |

OTHER PUBLICATIONS

Dewan, et al., "A Survey of Cloud Storage Facilities", In Proceedings of IEEE World Congress on Services, Jul. 4, 2011, 8 pages.

(Continued)

*Primary Examiner* — James Trujillo
*Assistant Examiner* — Aida Tessema
(74) *Attorney, Agent, or Firm* — Timothy Churna; Doug Barker; Micky Minhas

(57) ABSTRACT

Storing and retrieving files based on hashes for the files. One method for storing files includes: identifying a file; identifying a hash calculated based on the file; renaming the file based on the hash based on the file; and storing the file in a particular location based on the hash calculated based on the file. Another method for retrieving files includes: identifying a hash for a given file; using the hash, traversing a hierarchical file structure to find a location where the given file should be stored; determining that the file is at the location; and as a result, retrieving the file.

20 Claims, 3 Drawing Sheets

(56) References Cited

OTHER PUBLICATIONS

Calder, et al., "Windows Azure Storage: A Highly Available Cloud Storage Service with Strong Consistency", In Proceeding of Twenty-Third ACM Symposium on Operating Systems Principles, Oct. 23, 2011, 15 pages.

Mkandawire, Stephen, "Improving Backup and Restore Performance for Deduplication-based Cloud Backup Services", In Thesis of Degree of Master of Science, Graduate College at the University of Nebraska, Apr. 1, 2012, 74 pages.

Li-Chen, et al., "Super-Fast Image Data Retrieval Method Based on Hash Algorithm", In Proceedings of Fourth International Conference on Innovative Computing, Information and Control, Dec. 7, 2009, 3 pages.

\* cited by examiner

LARGE SCALE FILE STORAGE IN CLOUD COMPUTING

BACKGROUND

Background and Relevant Art

Computers and computing systems have affected nearly every aspect of modern living. Computers are generally involved in work, recreation, healthcare, transportation, entertainment, household management, etc.

Further, computing system functionality can be enhanced by a computing systems ability to be interconnected to other computing systems via network connections. Network connections may include, but are not limited to, connections via wired or wireless Ethernet, cellular connections, or even computer to computer connections through serial, parallel, USB, or other connections. The connections allow a computing system to access services at other computing systems and to quickly and efficiently receive application data from other computing system.

Often, computer systems require the storage of a large quantity of files. This may be particularly true in interconnected systems such as distributed or so called "cloud" based storage systems, such as Windows Azure™ storage available from Microsoft Corporation of Redmond Wash. These distributed storage systems offer a virtually unlimited storage mechanism for storing arbitrary data in a distributed environment that is accessible remotely. However, such mechanisms usually do not impose any structure or suggest an architecture for enabling a fast, efficient and scalable mechanism for storing a large collection of unique files in an efficient and easy way both for reading and for writing.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method that may be practiced in a computing environment. The method includes acts for storing files. The method includes: identifying a file; identifying a unique hash calculated based on the file; renaming the file based on the hash based on the file; and storing the file in a particular location based on the hash calculated based on the file.

Other embodiments described herein include a method practiced in a computing environment for retrieving files. The method includes: identifying a hash for a given file; using the hash, traversing a hierarchical file structure to find a location where the given file should be stored; determining that the file is at the location; and as a result, retrieving the file.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Some embodiments described herein implement a solution to storing and retrieving large quantities of files. Such large quantities of files may be stored in a distributed storage environment such as a so called "cloud" environment such as Windows Azure™ available from Microsoft Corporation of Redmond Wash. In other embodiments, other systems may have need and/or capability for storing large quantities of files.

In some embodiments, files are organized based on hash codes of the files. This can ensure that all files are unique, such that only a single copy of any given files is stored in an entire system. This can also be used to accomplish very fast insertion and retrieval of files into a storage system and very fast detection of duplicate files. Additionally, this can be used to more evenly distribute file storage as good hashing functions often produce significantly different hash values even on very similar files (what is known as the avalanche effect)resulting in substantially even distributions of hashes.

As noted, embodiments may include hash code based organization of a large number of files. In some embodiments, this may include hash code based organization of a large number of files in distributed storage for fast insertion and retrieval. Some embodiments may include a URI (Uniform Resource Identifier) naming scheme based on hash codes allowing fast insertion and retrieval of files from the storage. Embodiments may include functionality for detection of singularity (or duplication) of files at insertion time in storage. Additional details are now illustrated.

Figure 1:
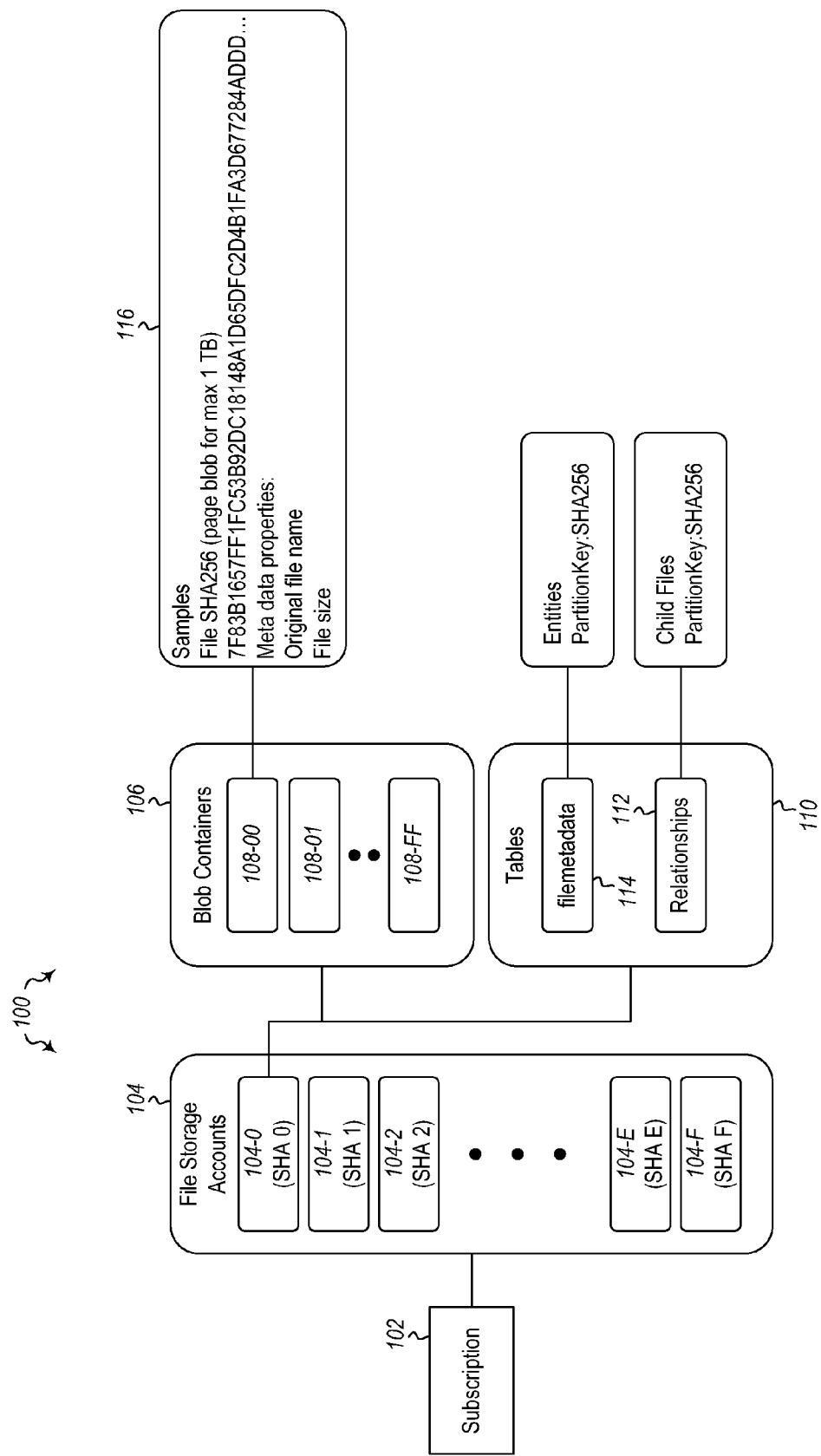
FIG. 1 illustrates a hierarchical file structures accessed using elements of a hashes for files.

FIG. 1 illustrates one example structure of a storage system. FIG. 1 illustrates the system implemented in a so called "cloud" based system such as Windows Azure™ available from Microsoft Corporation of Redmond Wash. In this description, "cloud computing" may be systems or resources for enabling ubiquitous, convenient, on-demand network access to a shared pool of configurable computing resources (e.g., networks, servers, storage, applications, services, etc.) that can be provisioned and released with reduced management effort or service provider interaction. A cloud model can be composed of various characteristics (e.g., on-demand self-service, broad network access, resource pooling, rapid elasticity, measured service, etc), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

FIG. 1 illustrates a storage service 100. Figure further illustrates a subscription 102. The subscription 102 represents functionality for identifying and billing a customer for storage services provided by a cloud storage service. In the illustrated example, each subscription contains 16 storage accounts 104. In this example, each storage account is marked with 104-0, 104-1, 104-2 . . . to 104-E, and 104-F. Each storage account, in the illustrated example, can contain up to 100 TB of data. In the illustrated example, files to be stored in the storage system are hashed to a 256 bit hash value. In some embodiments, each file may be hashed to a SHA256 hash value. Each of the storage accounts 104-0 through 104-F corresponds to the first letter of the hexadecimal representation (i.e., the first four bits) of the 256 bit hash code of a file.

Each storage account contains a range of files divided into 256 blob containers. Note however, that only a single blob container 106 is shown for brevity. Each blob container contains a range of files based on the second and third letters of the hexadecimal representation of the 256 hash code of a file. Representative blobs 108-00, 108-01 and 108-FF for files are illustrated in FIG. 1.

Each blob container contains blobs named using the hash code, one blob per file. Each blob may also contain meta-data for the files. For example, a blob may contain an original filename for a file, a file size, a creation date, a modification date, user or creator information, etc.

FIG. 1 further illustrates a set 110 of tables that can be maintained on a per storage account basis. The set 110 of tables, in the illustrated example, includes a relationships table 112 and a file metadata table 114. The relationships table 112 contains parent-child records with the hash value of the parent and the hash value of the child as partition key and row key.

The file metadata table 112 includes similar properties for each blob including information such as original filename, size, etc. The file metadata table 112 allows flat (indexed by hash value) access to the files structure.

Embodiments may be implemented Windows Azure™ blob and table storage available from Microsoft Corporation of Redmond Wash. (or other suitable storage mechanisms) as the underlying raw storage mechanism. As noted, embodiments may use hash values of the files as unique identifiers for storing them in storage. Windows Azure™ storage offers a large scale, highly performant, distributed storage mechanism that allows for storing arbitrary data in two major forms, namely: tables and blobs. A table in Windows Azure™ allow for storing schema-less discrete entities that are referenced by two indices—their partition ID and row ID. Together both these values uniquely identify an entity in the table and allows for fast retrieval and insertion of data into the table. Blobs allow for storing of large binary data in a free structure based on containers and URI naming. In some embodiments, each blob can store up to 1 TB in size.

These storage mechanisms are contained within a storage account that allows, in some example system, for maximum of 100 TB of storage to be allocated for all tables and blobs inside a single storage account. For storing files in excess of 100 TB, multiple storage accounts are used. However, it should be appreciated that other configurations and systems can be used with different storage limits.

Each file in the system (up to the 1 TB in size in the illustrated examples) is stored in a blob with a URI that is generated by computing the SHA256 hash code of the file, a mapping function maps this hash code to a unique URI that is composed of a storage account name along with the blob container 106 and the actual blob name, uniquely identifying the file in the system. This URI can later be used both for writing to the file, reading from it, and verifying its existence (in case a duplicate file is requested to be stored). FIG. 1 illustrates an example file 116 stored in a blob 108-00 of a blob container 106. A SHA256 hash value provides a unique 256 bit value of the file, thus ensuring that no two different files will produce the same hash value and also provides an even distribution of files in multiple storage accounts. Each file which is stored than in a blob also maintains a set of properties (or metadata) of the file, such as its original name and size.

Relationships between files (such as containment of parent and child files in case of compressed containers file, like Zip or Cab), are stored in a Windows Azure™ relationships table 112 in the form of parent-child link with the parent files SHA256 hash value and the child SHA256 value forming a row in the relationship table.

In one particular embodiment illustrated herein, the embodiment uses 16 storage accounts to allow for a maximum size of 1.6 PB of data all around, with 256 blob containers in each storage account. Files are then stored in blob containers 106 with one file in each single blob (referred to generally as 108).

URI Mapping Process

The following illustrates a URI mapping function that takes a file and produces a unique URI for it. A hash code for a file is obtained, such as by hashing the file using a SHA256 hashing algorithm. For present example, assume that the hash (in hexadecimal format) 7F83B1657FF1FC53B92DC181 48A1D65DFC2D4B1FA3D677284ADDD200126D9069 is obtained. This hash is converted into a string. The first character of the hash string is used to map into one of the 16 storage accounts 104 and more specifically into a blob container 106. In the illustrated example storage account 7 (which would be illustrated as storage account 104-7 if shown in FIG. 1 rather than represented in the group of storage accounts represented by the ellipses of the set of storage accounts 104) will be used because the first character of the hash is "7". While in this example the letter of the hash string is used, other letters of the hash string may be used, however, the same position of character should be used for each mapping operation. For example if the $2^{nd}$ character is used to map to a storage account for a given file, then the $2^{nd}$ character should be used for other files as well.

However, in the present example, the second and third characters of the hash value string are used to identify the blob (illustrated generally as 108) in which the file will be stored. In the above example, that second and third characters are F8, thus the file would be stored in a blob 108-F8 (if shown in the FIG. 1 rather than being represented by the ellipses of the blob container 106). The remaining characters are used construct the actual blob name. In the above case, that would be 3B 16571-11FC53B92DC18148A1D65DFC2D4B 1FA3D677284ADDD200126D906 9.

The resulting URI for this file, will be then (in Windows Azure™):

http://fs-7.blob.core.windows.net/F8/ 3B1657FF1FC53B92DC18148A1D65DFC2D4B1FA3 D677284ADDD200126D9069 (assuming storage accounts are named fs-0, fs-1, fs-f).

File Storage Process

Each file that is to be stored in the system goes through a file storage process as illustrated below. A hash code for the file is calculated using the SHA256 Hash algorithm, this results in a 256 bit binary value. This binary value is converted to its hexadecimal representation in the form of 0-F Ascii code, resulting in a 64 letters string. For instance the SHA256 hash code for a file containing the text "Hello World!" is: 7F83 B1657FF1FC53B92DC18148A1D65DFC2D4B1FA3D677 284ADDD200126D 9069. Based on this string, a mapping function is used to map this entry into a unique URI (as described above) that governs the name of the blob that is going to be used to store this file into. A detection process is performed to determine if the file is already present in the storage by determining if the URI already exist in the system.

If URI does not exist, a new blob 108 is created using the URI, and the file binary data is written to the new URI. Additional file metadata (e.g. its original name and size) may be written to the blob metadata.

Container File Storage Process

A file can be determined to be a container. This can be done, for example, by inspecting its contents, and in particular, its header. Once a file is determined to be a container, storing it and its contained files is done by the following process.

A hash code for the file is calculated using the SHA256 Hash algorithm. This results in a 256 bits binary value. This binary value is converted to its hexadecimal representation in the form of 0-E Ascii code, resulting in a 64 character string. Based on this string, a mapping function is used to map this entry into a unique URI that governs the name of the blob that is going to be used to store this file into. Detection is performed to determine if the container file is already present in the storage by finding out if the URI already exist. If the URI does not exist, the container file is decomposed and decompressed into each of its discrete files contained in the container. Each file then goes through the same process as storing in container file storage process (if it is a container by itself), or a discrete file storage process outlined above. During the decomposition and decompression, parent-child records are entered into the relationships table 112 to maintain the relationships using both hash codes of the parent container and the child file.

File Retrieval process

When file content or metadata is to be retrieved, the caller can provide either the SHA256 hash code of the file (which was previously stored), or using a blob container scanning API, browse through the entire collection of files stored in the system. In case a hash code is given, the process to retrieve the files is as follows. A SHA256 hash code for the file which is requested to be read is accessed. This binary value is converted to its hexadecimal representation in the form of 0-F Ascii code, resulting in a 64 character string. Based on this string, a mapping function is used to map this entry into a unique URI that governs the name of the blob from which the file is going to be read. A detection is made to note if the unique URI exists. If the URI exists, the file is present in the storage system, if not, file does not exist in the storage system. If The URI is valid, a handle to the blob storage is returned and the caller can read the content of the file directly from the blob, or read any of the metadata properties of it (like name, original size) using a metadata retrieval API, such as the metadata retrieval API provided by Windows Azure™ storage.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 2:
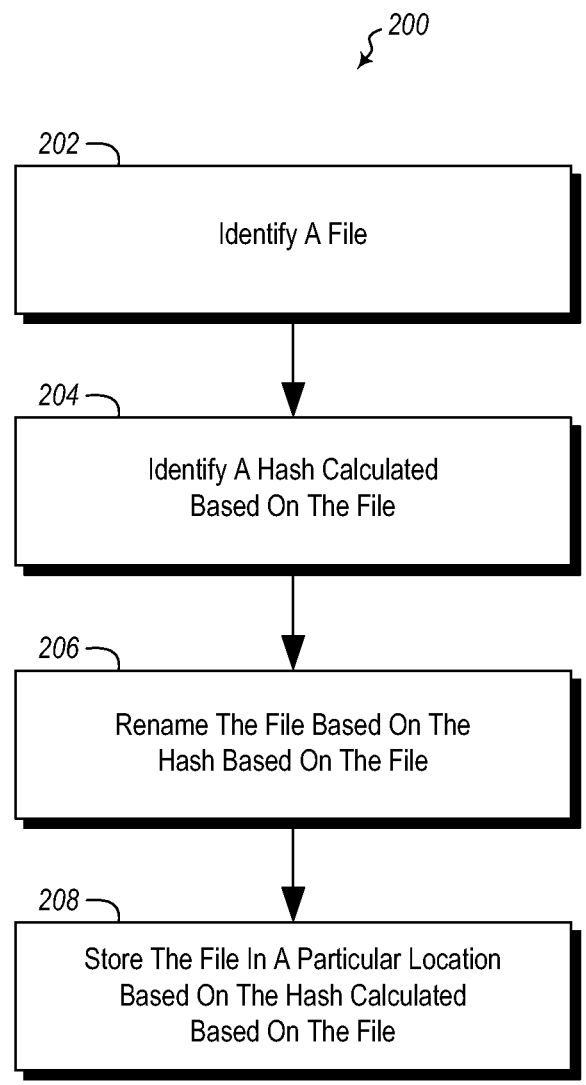
FIG. 2 illustrates a method of storing files using hashes of the files.

Referring now to FIG. 2, a method 200 is illustrated. The method 200 may be practiced in a computing environment. The method 200 includes acts for storing files. The method 200 includes identifying a file (act 202). The method 200 further includes identifying a hash calculated based on the file (act 204). The method further includes renaming the file based on the hash based on the file (act 206). The method further includes storing the file in a particular location based on the hash calculated based on the file (act 208). FIG. 1 illustrates a file 116 renamed based on a hash and stored in a structure based on the hash.

The method 200 may further include using a first portion of the hash to identify a top level storage location and a second portion of the hash to identify a lower level storage location in the top level storage location to identify the particular location to store the file. As illustrated in FIG. 1, a first portion of the hash identifies a file storage account from the file storage accounts 104, while a second portion of a hash identifies a blob container. More generically, the method 200 may include using different portions of the hash to correspond to different locations within a storage hierarchy for storing the file.

The method 200 may further include functionality for ensuring that duplicate files are not stored in the system. Thus, method 200 may further include identifying a second file, identifying a hash calculated based on the second file, determining that the hash calculated based on the second file is the same as the hash calculated based on the file, and as a result determining to not store the second file due to the second file being redundant to the file.

The method 200 may further include storing the original file name as metadata of the file. Alternatively or additionally, the method may include storing a list of original file names for files that contains the same data (hence considered the same file) that might be named differently in the original storage medium they came from. As noted, the file may be renamed based on a hash of the file. Thus, to preserve the original name of the file, it may be stored as metadata for the file. Similarly, the method 200 may further include storing at least one of file size of the file, creation date of the file, or edit date of the file as metadata of the file.

The method 200 may further include determining that the file is a container file; decomposing the container file into each of its discrete files contained in the container file; identifying a corresponding hash for each of the discrete files, each hash calculated based on a discrete file; renaming each discrete file contained in the container file based on its corresponding hash; storing each discrete file in a particular location based on its corresponding hash; and linking each discrete file to the container file. As illustrated above this may include linking each discrete file to the container file in a relationships table to link each discrete file to the container file.

Figure 3:
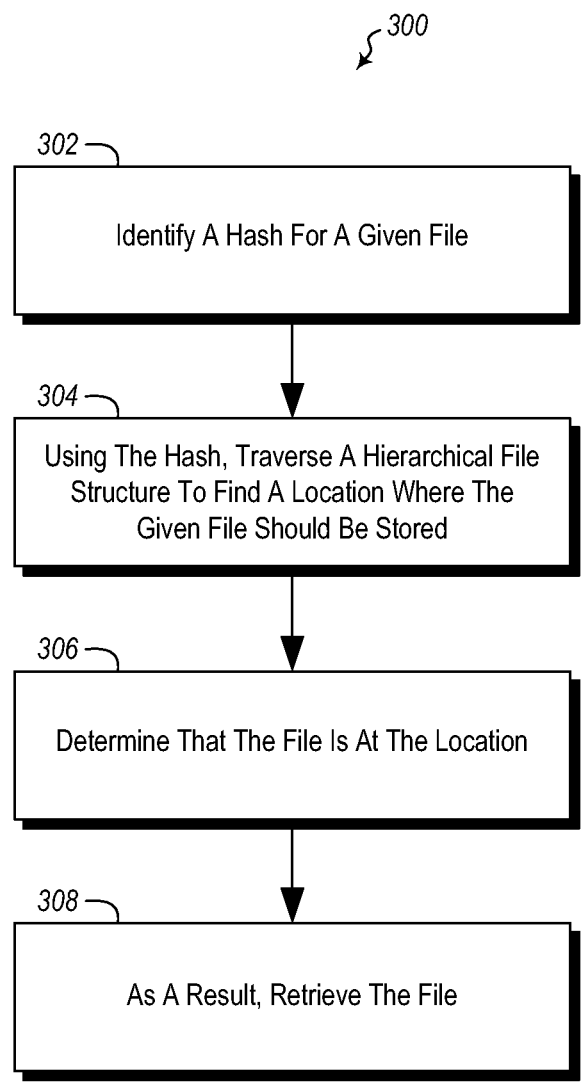
FIG. 3 illustrates a method of retrieving files using hashes of the files.

Referring now to FIG. 3, a method 300 is illustrated. The method 300 may be practiced in a computing environment and includes acts for retrieving files. The method 300 includes identifying a hash for a given file (act 302). For example, a hash may be calculated or retrieved from a stored location. The method 300 further includes using the hash, traversing a hierarchical file structure to find a location where the given file should be stored (act 304). For example, a first character of a hexadecimal hash string may be used to identify a blob container and the second and third characters of the hash may be used to identify a specific blob.

The method 300 further includes determining that the file is at the location (act 306). As a result, the method 300 further includes retrieving the file (act 308).

The method 300 may further include using a first portion of the hash to identify a top level storage location and a second portion of the hash to identify a lower level storage location in the top level storage location to identify the location where the given file should be stored. Examples of this are illustrated in FIG. 1 described above. More generally, the method 300 may include using different portions of the hash to correspond to different locations within a storage hierarchy for identifying the location where the given file should be stored.

The method 300 may further include retrieving an original file name from metadata of the given file. As noted above, as the file is renamed based on its hash, such as for example to have a name that includes all or a portion of its hash, it may be useful to store and retrieve the original name of the file that existed prior to renaming. Similarly, the method 300 may further include retrieving at least one of file size of the given file, creation date of the given file, or edit date of the given file from metadata of the file.

The method 300 may further include: determining that the given file is a container file; identify links to each of the discrete files contained in the container file; identifying a corresponding hash for each of the discrete files; using the corresponding hashes, traversing the hierarchical file structure to find locations where each of the discrete files should be stored; determining that the discrete files are at the locations; and as a result, retrieving the discrete files. This functionality allows container files that store other files to utilize the functionality of the system. Some examples of these embodiments may further include referencing a relationships table to identify links to each discrete file.

Further, the methods may be practiced by a computer system including one or more processors and computer readable media such as computer memory. In particular, the computer memory may store computer executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer readable storage media and transmission computer readable media.

Physical computer readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer readable media to physical computer readable storage media (or vice versa). For example, computer-executable instructions or data structures received over a network or data link can be buffered in RAM within a network interface module (e.g., a "NIC"), and then eventually transferred to computer system RAM and/or to less volatile computer readable physical storage media at a computer system. Thus, computer readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computing environment, a method of storing files, the method comprising:
   identifying a file;
   determining, based on a header of the file, that the file is a compressed container file that includes a plurality of compressed files;
   identifying a hash calculated based on content of the compressed container file;
   using a first portion of the hash, identifyig a particular file storage account from among a plurality of file storage accounts under which the compressed container file will be stored;
   using a second portion of the hash, identifying a particular blob container from among a plurality of blob containers within the particular file storage account into which the compressed container file will be stored;
   renaming the compressed container file based on the hash, the compressed container file being renamed a file name that includes one or more portions of the hash;
   storing the compressed container file in the particular blob container within the particular file storage account;
   decompressing each of the plurality of compressed files from the compressed container file, to obtain a plurality of decompressed files;
   for each of the plurality of decompressed files:
      identifying a hash corresponding to said decompressed file, the hash calculated based on content of said decompressed file;
      using the corresponding hash, identifying an appropriate blob container from among the plurality of blob containers within an appropriate file storage account from among the plurality of file storage accounts into which said decompressed file will be stored;
      renaming said decompressed file based on the corresponding hash, said decompressed file being renamed a file name that includes one or more portions of the corresponding hash; and
      storing said decompressed file in the appropriate blob container within the appropriate file storage account; and
   storing metadata linking each of the plurality of decompressed files to the compressed container file.

2. The method of claim 1, wherein the hash is a hexadecimal string converted from a binary value of the compressed container file, and wherein a single letter from the hexadecimal string is used as the first portion of the hash to identify the particular file storage location and one or more different letters from the hexadecimal string are used as the second portion of the hash to identify the particular blob container within the file storage location.

3. The method of claim 2, further comprising using different portions of the hash, excluding the first and second portions, as the file name.

4. The method of claim 1, further comprising:
   identifying a second file;
   identifying a hash calculated based on the second file;
   determining that the hash calculated based on the second file is the same as the hash calculated based on the compressed container file; and
   as a result, determining to not store the second file due to the second file being redundant to the compressed container file.

5. The method of claim 1, further comprising storing an original file name of the file as metadata of the file.

6. The method of claim 1, further comprising storing at least one of a file size of the file, a creation date of the file, or an edit date of the file as metadata of the file.

7. The method of claim 1, further comprising practicing the method in a distributed computing environment to handle a large set of files and to reduce or eliminate duplication of files in the large set of files.

8. The method of claim 1, wherein storing metadata linking each of the plurality of decompressed files to the compressed container file comprises storing the metadata in a relationships table of a database.

9. A computing system for retrieving files, the computing system comprising:
   one or more processors; and
   one or more computer readable media, wherein the one or more computer readable media comprise computer executable instructions that are executable by at least one of the one or more processors and that configure at least one of the one or more processors to perform the following:
      identify a hash for a given file;
      access metadata linking the hash to a compressed container file that is stored in a storage system and that includes a plurality of compressed files, and identify a plurality of additional hashes that each correspond to a different one of a plurality of decompressed files that are also stored in the storage system, each of the plurality of decompressed files corresponding to a different one of the plurality of compressed files; and
      for each of the plurality of additional hashes:
         using said additional hash, traverse a hierarchical file structure of the storage system to find a location where the corresponding decompressed file should be stored, by at least using a first portion of said additional hash to identify a file storage account under which the corresponding decompressed file is stored, and using a second portion of said additional hash to identify a blob container within the file storage account into which the corresponding decompressed file is stored;
         determine that the corresponding decompressed file is at the location defined by the blob container within the file storage account;
         as a result, retrieve the corresponding decompressed file from the storage system.

10. The computing system of claim 9, wherein the hash is a hexadecimal string converted from a binary value of the given file, and wherein a single letter from the hexadecimal string is used as the first portion of the hash and one or more other letters from the hexadeximal string is used as the second portion of the hash.

11. The computing system of claim 9, wherein the executable instructions also configure at least one of the one or more processors to retrieve an original file name of each plurality of decompressed files from the metadata.

12. The computing system of claim 9, wherein the executable instructions also configure at least one of the one or more processors to retrieve, for at least one of the plurality of decompressed files, at least one of file size, creation date, or edit date from the metadata.

13. The computing system of claim 9, wherein the computing system is in a distributed computing environment, to handle a large set of files and to reduce or eliminate duplication of files in the large set of files.

14. A computing system for storing files, the computing system comprising:
one or more processors; and
one or more computer readable media, wherein the one or more computer readable media comprise computer executable instructions that are executable by at least one of the one or more processors and that configure at least one of the one or more processors to perform the following:
identify a file;
determine, based on a header of the file, that the file is a compressed container file that includes a plurality of compressed files;
identify a hash calculated based on content of the compressed container file;
using a first portion of the hash, identify a particular file storage account in a distributed computing environment in which the file will be stored;
using a second portion of the hash, identify a particular blob container hierarchically below the particular file storage account;
rename the compressed container file based on the hash, the compressed container file being renamed a file name that includes one or more portions of the hash;
store the compressed container file in the blob container
decompress each of the plurality of compressed files from the compressed container file, to obtain a plurality of decompressed files;
for each of the plurality of decompressed files:
identify a hash corresponding to said decompressed file, the hash calculated based on content of said decompressed file;
using the corresponding hash, identify an appropriate blob container within an appropriate file storage account into which said decompressed file will be stored;
rename said decompressed file based on the corresponding hash, said decompressed file being renamed a file name that includes one or more portions of the corresponding hash; and
store said decompressed file in the appropriate blob container within the appropriate file storage account; and
store metadata linking each of the plurality of decompressed files to the compressed container file.

15. The computing system of claim 14, wherein the executable instructions also configure at least one of the one or more processors to store an original file name of the file as metadata of the file.

16. The computing system of claim 14, wherein the executable instructions also configure at least one of the one or more processors to store at least one of file size of the file, creation date of the file, or edit date of the file as metadata of the file.

17. The computing system of claim 14, wherein storing metadata linking each of the plurality of decompressed files to the compressed container file comprises storing the metadata in a relationships table of a database.

18. The computing system of claim 14, wherein the executable instructions also configure at least one of the one or more processors to perform the following:
identify a second file;
identify a hash calculated based on the second file;
determine that the hash calculated based on the second file is the same as the hash calculated based on the compressed container file; and
as a result, determine to not store the second file due to the second file being redundant to the compressed container file.

19. The computing system of claim 14, wherein the executable instructions also configure at least one of the one or more processors to use different portions of the hash, excluding the first and second portions, as the file name.

20. The computing system of claim 14, wherein the hash is a hexadecimal string converted from a binary value of the compressed container file, and wherein a single letter from the hexadecimal string is used as the first portion of the hash to identify the particular file storage location and one or more different letters from the hexadecimal string are used as the second portion of the hash to identify the particular blob container within the file storage location.

* * * * *